(12) United States Patent
Dao et al.

(10) Patent No.: US 8,723,482 B2
(45) Date of Patent: May 13, 2014

(54) BATTERY UNIT BALANCING SYSTEM

(75) Inventors: Yuan Dao, Phoenix, AZ (US); William Schlanger, Flagstaff, AZ (US)

(73) Assignee: Elite Power Solutions LLC, Tempe, AZ (US)

(*) Notice: Subject to any disclaimer, the term of this patent is extended or adjusted under 35 U.S.C. 154(b) by 645 days.

(21) Appl. No.: 12/939,889

(22) Filed: Nov. 4, 2010

(65) Prior Publication Data

US 2011/0074355 A1 Mar. 31, 2011

(51) Int. Cl.
*H02J 7/00* (2006.01)
*H02J 7/14* (2006.01)

(52) U.S. Cl.
CPC ............. *H02J 7/0013* (2013.01); *H02J 7/0014* (2013.01); *H02J 7/0016* (2013.01); *H02J 7/1423* (2013.01)
USPC ........... 320/122; 320/104; 320/120; 320/124; 320/125; 320/130

(58) Field of Classification Search
USPC ......... 320/116, 118, 119, 122, 132, 152, 121, 320/124, 128, 103, 165
See application file for complete search history.

(56) References Cited

U.S. PATENT DOCUMENTS

| | | |
|---|---|---|
| 4,622,508 A | 11/1986 | Matteau et al. |
| 5,028,499 A | 7/1991 | Pearce et al. |
| 5,283,512 A | 2/1994 | Stadnick et al. |
| 5,504,415 A | 4/1996 | Podrazhansky et al. |
| 5,592,067 A | 1/1997 | Peter et al. |
| 5,594,320 A | 1/1997 | Pacholok et al. |
| 5,666,041 A | 9/1997 | Stuart et al. |
| 5,710,504 A | 1/1998 | Pascual et al. |
| 5,889,385 A | 3/1999 | Podrazhansky et al. |
| 5,920,179 A | 7/1999 | Pedicini |
| 5,956,241 A | 9/1999 | LoCascio |
| 5,965,996 A * | 10/1999 | Arledge et al. ............... 320/116 |
| 5,982,143 A | 11/1999 | Stuart |
| 6,040,685 A | 3/2000 | Tsenter et al. |
| 6,081,095 A | 6/2000 | Tamura et al. |
| 6,140,800 A | 10/2000 | Peterson |
| 6,222,344 B1 | 4/2001 | Peterson et al. |
| 6,225,780 B1 | 5/2001 | Koch |
| 6,291,972 B1 | 9/2001 | Zhang |
| 6,377,024 B1 | 4/2002 | Choy |
| 6,388,424 B1 * | 5/2002 | Hidaka et al. ................. 320/122 |
| 6,489,753 B1 | 12/2002 | Patterson |
| 6,636,020 B1 | 10/2003 | Ronald |
| 6,771,045 B1 | 8/2004 | Keller |
| 7,085,338 B2 | 8/2006 | Huelss |
| 7,443,138 B2 | 10/2008 | Ishikawa et al. |
| 7,471,066 B2 | 12/2008 | Ambrosio et al. |
| 7,486,049 B2 | 2/2009 | Wan |
| 7,508,165 B2 * | 3/2009 | Sobue et al. .................. 320/118 |
| 7,564,218 B2 * | 7/2009 | Ooishi et al. .................. 320/118 |
| 7,602,145 B2 | 10/2009 | Renda |
| 7,701,169 B2 | 4/2010 | Wang et al. |
| 2001/0019269 A1 * | 9/2001 | Yudahira ....................... 324/426 |

(Continued)

*Primary Examiner* — Edward Tso
*Assistant Examiner* — Alexis Boateng
(74) *Attorney, Agent, or Firm* — Invention To Patent Services LLC; Alex R Hobson

(57) ABSTRACT

A battery unit balancing system comprises a discharging circuit and means for connecting the discharging circuit to a battery unit. The discharging circuit is configured such that it is automatically activated, when a voltage of the battery unit exceeds a predetermined threshold, to draw a constant discharging current from the battery unit until the voltage of the battery unit falls below the predetermined threshold.

12 Claims, 4 Drawing Sheets

(56) References Cited

U.S. PATENT DOCUMENTS

| | | |
|---|---|---|
| 2002/0175655 A1* | 11/2002 | Huykman et al. ............ 320/116 |
| 2004/0189248 A1* | 9/2004 | Boskovitch et al. .......... 320/116 |
| 2006/0012334 A1 | 1/2006 | Watson |
| 2006/0012336 A1* | 1/2006 | Fujita ............................ 320/119 |
| 2007/0188138 A1* | 8/2007 | Kobayashi ..................... 320/119 |
| 2009/0079396 A1* | 3/2009 | Osamura ........................ 320/134 |
| 2009/0091293 A1* | 4/2009 | Wang et al. ................... 320/118 |
| 2009/0195213 A1* | 8/2009 | Li et al. ......................... 320/136 |
| 2011/0062917 A1* | 3/2011 | Shiu et al. ..................... 320/118 |

* cited by examiner

BATTERY UNIT BALANCING SYSTEM

FIELD OF THE INVENTION

The present application is directed to systems and methods for balancing a battery unit. In particular, the present application is directed to systems and methods for automatically activating a discharging circuit when the voltage of a battery unit exceeds a predetermined threshold. The discharging circuit draws a constant discharging current from the battery unit until the voltage of the battery unit falls below the predetermined threshold, thereby obtaining a battery unit of about the predetermined threshold.

BACKGROUND

A battery pack for an electric vehicle can include a number of battery units connected in series, each of which needs to be charged equally. A charger can charge the battery pack to a predetermined voltage per battery unit. However, the individual battery units may not be charged to the same level, and the discrepancy between the units' state of charge levels can cause safety, reliability, and performance problems. The battery pack capacity is limited to the capacity of the lowest battery unit. Further, when some battery units have higher state-of-charge levels than others, the overcharged units can lead to unsafe conditions, such as fire and explosion. Additionally, when some battery units have lower state-of-charge levels, as the battery discharges, those units may discharge to a level resulting in permanent loss of unit capacity.

SUMMARY OF THE INVENTION

The solution of the present application provides systems and methods for balancing a battery unit. The balancing system can be attached to a single battery unit. When the battery unit and balancing system are attached, the battery unit can power a green LED to indicate a proper connection has been made. If the voltage of the battery unit exceeds a threshold, the battery unit can power a red LED, thereby indicating to a user that a discharging circuit has been activated. The discharging circuit automatically draws current from the battery unit and stops when the voltage of the battery unit falls below the threshold. Thus, the solution can obtain a battery unit with a desired state of charge level.

In one aspect, the present application is directed to a battery unit balancing system. The balancing system includes a discharging circuit and means for connecting the discharging circuit to a battery unit. The discharging circuit is configured such that it is automatically activated, when a voltage of the battery unit exceeds a predetermined threshold, to draw a constant discharging current from the battery unit until the voltage of the battery unit falls below the predetermined threshold.

The discharging circuit can comprise a voltage dividing circuit, a comparator circuit, and one or more current source circuits. The voltage dividing circuit can be configured such that it is connected to a comparator circuit which is activated to conduct when the voltage of the battery unit exceeds the predetermined threshold. The voltage dividing circuit can be programmed to generate a predetermined voltage that activates the one or more current source circuits via the comparator circuit. Each of the one or more current source circuits can be configured such that a substantially stable current flows independent of the voltage of the battery unit.

The voltage dividing circuit can comprise one or more resistors that are programmed to generate the predetermined voltage. For each of the current source circuits, the first terminal of the means for connecting the balancing circuit can connect to an emitter of the first transistor and a first terminal of the first resistor. The base of the first transistor can connect to a second terminal of the first resistor and an emitter of the second transistor. A collector of the first transistor can connect to a base of the second transistor. A collector of the second transistor can connect to a second terminal of the means for connecting the balancing circuit. The comparator circuit can comprise a shunt regulator.

The predetermined voltage generated by the voltage dividing circuit can be about 1.2 V. The comparator circuit may not conduct when the voltage of the battery unit is below the predetermined threshold. Each of the one or more current source circuits can comprise one or more transistors and one or more resistors and configured such that the one or more transistors interact to form an equilibrium so that the stable current flows through the one or more resistors, thereby dissipating power. The predetermined threshold can be about 3.7V.

The system can comprise a first output device for indicating the system is receiving power from the battery unit and a second output device for indicating the discharging circuit is activated. The first output device can be a green LED and the second output device can be a red LED. The battery unit can be a single battery cell. The battery unit can comprise one or more battery cells. The battery cell can be a lithium ion cell. The discharging current can be about 0.5% of the ampere-hour rate of the battery unit. The discharging current can be selected from 0.22 A, 0.33 A, 0.5 A, 0.89 A or 1.11 A.

In another aspect, the present application is directed to a system for providing a balancing charge cycle for a battery pack comprising a plurality of battery units. The system can include a plurality of discharging units, each of which is connected to each of the plurality of battery units. Each of the plurality of discharging units can be configured such that it is automatically activated, when a voltage of the corresponding battery unit exceeds a predetermined threshold, to draw a constant discharging current from the corresponding battery unit until the voltage of the corresponding battery unit falls below the predetermined threshold. Each of the plurality of discharging units can be autonomous.

The discharging circuit of each of the plurality of discharging units can comprise a voltage dividing circuit, a comparator circuit, and one or more current source circuits. The voltage dividing circuit can be configured such that it is activated to conduct when the voltage of the battery unit exceeds the predetermined threshold. The voltage dividing circuit can be programmed to generate a predetermined voltage input to the comparator circuit that activates the one or more current source circuits. Each of the one or more current source circuits can be configured such that a substantially stable current flows independent of the voltage of the battery unit.

The predetermined threshold can be about 3.7 V. Each of the plurality of charging units can comprise a first output device for indicating the system is receiving power from the corresponding battery unit and a second output device for indicating the discharging circuit is activated. The first output device can be a green LED and the second output device can be a red LED. The battery pack can comprise 1-24 battery units, 16-150 battery units, or any number of units, as would be understood by one of ordinary skill in the art. Each of the plurality of battery units can be a single battery cell. Each of the plurality of battery units comprises one or more battery cells. The battery cell can be a lithium ion cell.

In another aspect, the present application is directed to a method for balancing a battery unit using any of the systems described above.

In another aspect, the present application is directed to a method for balancing a plurality of battery units. The method can include automatically drawing a substantially constant discharging current from the battery unit that is charged to a voltage above the predetermined threshold, by activating a discharging cycle for the battery unit. The method can include terminating the discharging cycle once the voltage is below the predetermined threshold.

The method can charge the plurality of battery units to a substantially same level. The method can include activating a second output device indicative of the discharging cycle.

BRIEF DESCRIPTION OF DRAWINGS

The foregoing and other objects, aspects, features, and advantages of the present application will become more apparent and better understood by referring to the following description taken in conjunction with the accompanying drawings, in which.

DETAILED DESCRIPTION

The present disclosure is directed to a battery unit balancing system. The balancing unit balancing system connects to a battery unit after the unit has been charged and discharges the unit to a desired, programmable voltage. The balancer can be permanently connected. The battery unit can be a standalone unit, such as a single battery cell, or include one or more battery cells. Battery units can be grouped to form battery packs, such as battery packs for electric vehicles, and battery unit balancing systems can be connected to the battery units to balance each of the units. In any of these embodiments, the battery units can be lithium ion cells.

Figure 1:
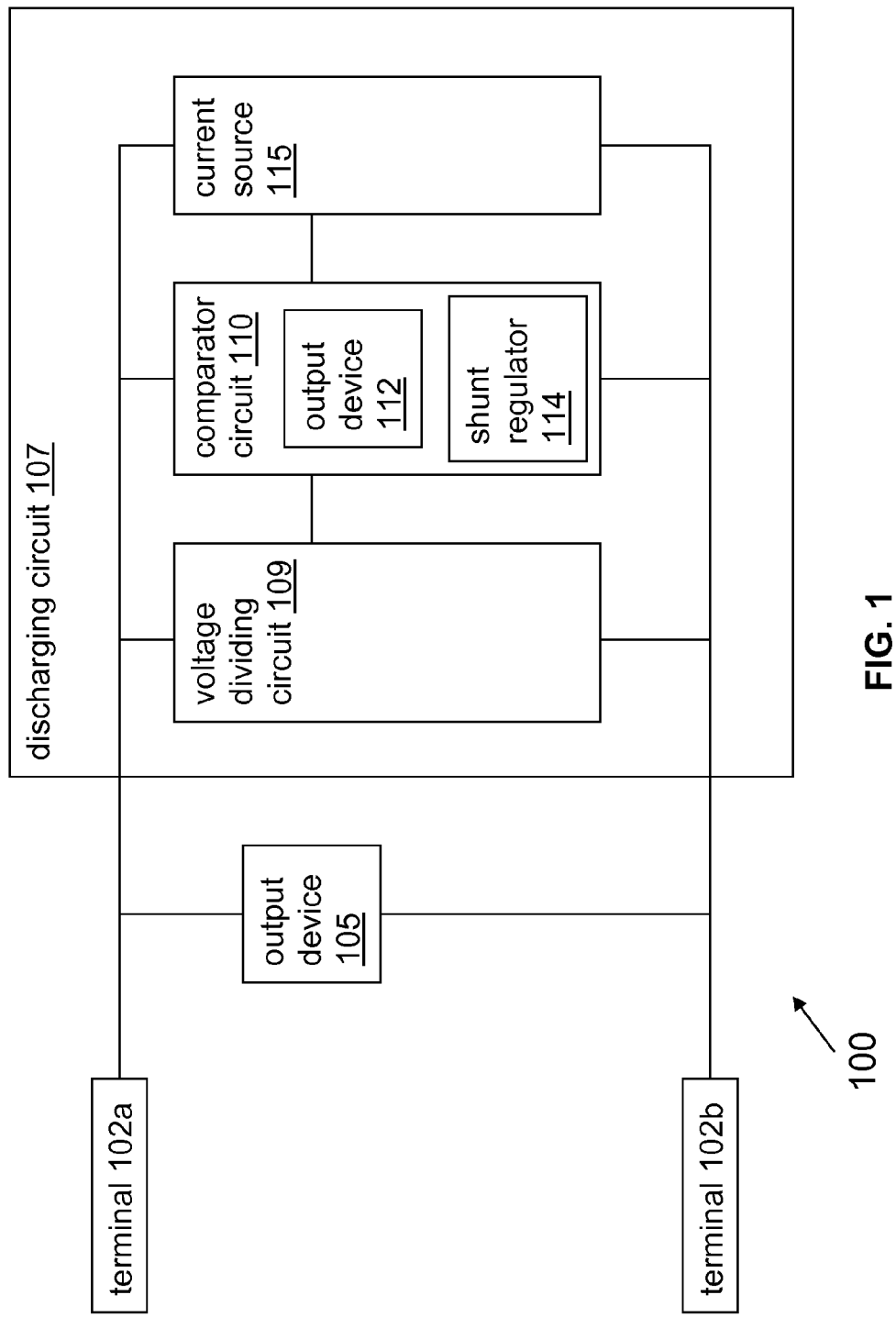
FIG. 1 is a block diagram of an embodiment of a battery unit balancing system.

Referring now to FIG. 1, a block diagram of an embodiment of a battery unit balancing system 100 is shown and described. The battery unit balancing system 100 can include a pair of terminals 102a and 102b (collectively, 102). The battery unit balancing system 100 can include an output device 105 and a discharging circuit 107. The discharging circuit 107 can include a voltage dividing circuit 109, a comparator circuit 110 with its own output device 112 and shunt regulator 114 (e.g., a programmable Zener diode, a TLV431 manufactured by Texas Instruments, Inc. of Dallas, Tex.), and a current source 115, each connected in parallel to the terminals 102. The voltage dividing circuit 109 can connect to the current source 115 via the comparator circuit 110.

In operation, the terminals 102 of the battery unit balancing system 100 can be connected to a battery unit. When the battery unit is connected to the terminals 102 with the incorrect polarity, no current flows. When the battery unit is connected correctly, current flows from one terminal 102a to the other 102b through the output device 105, powering the output device 105 (e.g., a light emitting diode or LED) to emit light. In this manner, the output device 105 can indicate to a user of the battery unit balancing system 100 that the battery unit has been correctly connected to the system 100 and the system 100 is receiving power.

The voltage dividing circuit 109 can generate a partial voltage based on the voltage of the battery unit and provide the partial voltage to the comparator circuit 110. When the voltage of the battery unit exceeds a predetermined threshold, the comparator circuit 110 can be automatically activated to conduct current from the battery unit. The current can power the output device 112 of the comparator circuit 110 to emit light. Thus, the output device 112 can indicate that the discharging circuit 107 has been activated.

Further, from the current, the comparator circuit 110 can generate a programmable voltage that activates the current source circuit 115. The current source 115 can draw a constant discharging current from the battery unit. As the current source 115 draws current, the voltage of the battery unit falls. When the voltage falls below the predetermined threshold, the comparator circuit 110 deactivates and the current source 115 ceases to draw current from the battery unit, leaving the battery unit with the desired voltage.

Figure 2:
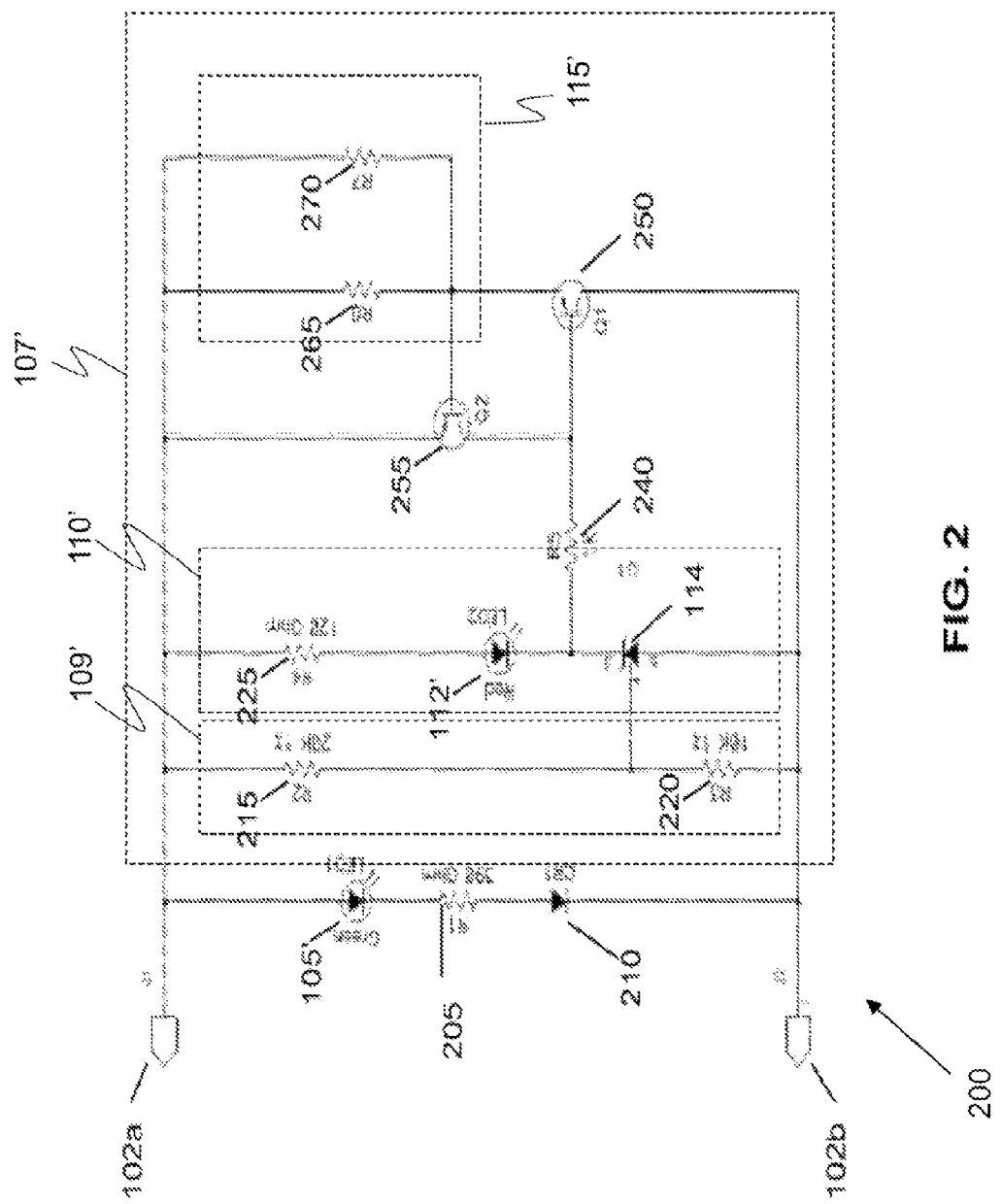
FIGS. 2-3 are circuit diagrams of embodiments of battery unit balancing systems.

Referring now to FIG. 2, a circuit diagram of an embodiment of a battery unit balancing system 200 is shown and described. The battery unit balancing system 200 includes a pair of terminals 102a and 102b (collectively, 102) that can connect to a battery unit. The system 200 includes an output device 105' (in this embodiment, a green LED) connected in series with a resistor 205 and another diode 210. When the voltage of the battery unit exceeds the on-voltages of the LED 105' and the diode 210, the LED 105' and diode 210 conduct. Current flows through the LED 105', and the LED 105' emits light to indicate to a user that the battery unit has been connected correctly to the system 200.

The voltage dividing circuit 109' generates a predetermined voltage at the node (also referred to herein as the "node voltage") between the first resistor 215 and the second resistor 220 to activate the shunt regulator 114 and consequently, the current source 115'. The resistances of the first resistor 215 and the second resistor 220 determine the value of the node voltage according to the following equation:

$$V_{node} = V_{battery\ unit} * R2/(R1+R2)$$

The resistors 215 and 220 can be variable resistors with adjustable resistances. The resistors can be programmed to generate any voltage from the voltage of the battery unit. In some embodiments, the resistors 215 and 220 can have fixed resistances. In this embodiment, the first resistor 215 has a resistance of 20,000 Ohms and the second resistor 220 has a resistance of 10,000 Ohms. Thus, the node voltage is ⅓ the voltage of the battery unit connected to the terminals 102.

When the voltage of the battery unit is below a predetermined threshold (e.g., about 3.7 V), the voltage dividing circuit 109' generates a node voltage below the on-voltage (e.g., about 1.2 V) of the shunt regulator 114. Under these circumstances, the shunt regulator 114 does not conduct. However, when the voltage of the battery unit equals or exceeds the predetermined threshold, the node voltage applied to the shunt regulator 114 activates the shunt regulator 114. Upon activation, current flows from the battery unit through the third resistor 225, the red LED 112', and the shunt regulator 114. The current powers the red LED 112', which emits light and indicates to a user that the discharge circuit 107' has been activated.

Further, current flowing through the comparator circuit 110 (e.g., from the base of the first transistor 250 through the fourth, current limiting resistor 240) can activate the current source 115. The current can flow through the fourth resistor 240 (e.g., out of the base of the first transistor 250) to form a voltage on the base of the first transistor 250, thereby beginning to turn on the first transistor 250 Once the first transistor 250 conducts, current can flow from the first terminal 102a of the battery unit through the fifth resistor 265, the sixth resistor 270, and the first transistor 250 to the second terminal 102b of the battery unit.

As current flows through the fifth 265 and sixth resistors 270 (e.g., out of the base of the second transistor 255), a voltage can form on the base of the second transistor 255. The voltage on the second transistor 255 rises, and the second transistor 255 begins to turn on. When the second transistor 255 conducts, the second transistor 255 draws current from the base of the first transistor 250 and starves the base for current. In this manner, the first transistor 250 and the second transistor 255 interact to form an equilibrium so that a substantially stable current flows from one terminal 102a to the other 102b through the fifth 265 and sixth resistors 270, thereby dissipating power. The current can continue to flow independent of the voltage of the battery unit. In some embodiments, the discharging current is about 0.5% of the ampere-hour rate of the battery unit. In many embodiments, the discharging current is selected from 0.22 A, 0.33 A, 0.5 A, 0.89 A or 1.11 A.

As the current source 115' draws current from the battery unit, the voltage of the battery unit falls. The node voltage of the voltage dividing circuit 110 falls in tandem. When the node voltage falls below the predetermined threshold of the shunt regulator 114, the shunt regulator 114 ceases to conduct. Current stops flowing through the red LED 112' and the red LED 112' turns off, thereby indicating to the user that the discharging circuit 107' is no longer activated. Consequently, current stops flowing to the base of the first transistor 250. In turn, the first transistor 250 stops conducting and thus shuts off the current source 115'. In this manner, the discharging circuit 107' automatically deactivates once the battery unit reaches the predetermined threshold voltage.

Figure 3:
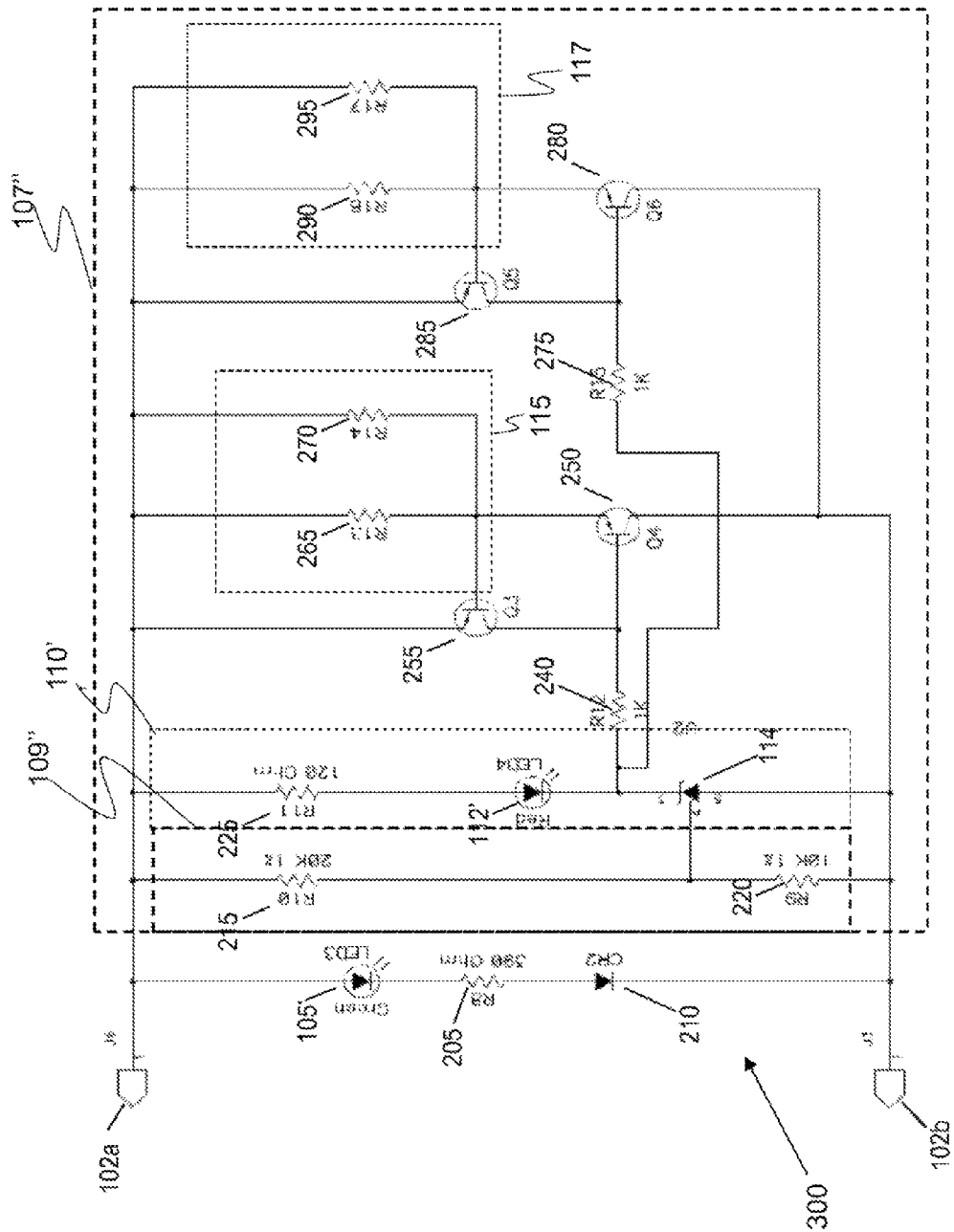

Referring now to FIG. 3, a circuit diagram of another embodiment of a battery unit balancing system 300 is shown and described. The battery unit balancing system 300 duplicates the terminals 102, output device 105', voltage dividing circuit 109, the comparator circuit 110, and current source 115 of the battery unit balancing system 200 of FIG. 2. In addition, the battery unit balancing system 300 includes a second current source 117. The second current source 117 duplicates the components of the first current source 115 and operates according to the same principles. Since each current source 115 draws the same amount of current, adding current sources to the discharging circuit 107" creates a balancing system 300 that drains the battery unit at a faster rate. In this manner, the battery unit balancing system 300 can balance a battery unit is a shorter amount of time. Although the system 300 includes two current sources, additional current sources can be added as desired by one of ordinary skill in the art.

Figure 4:
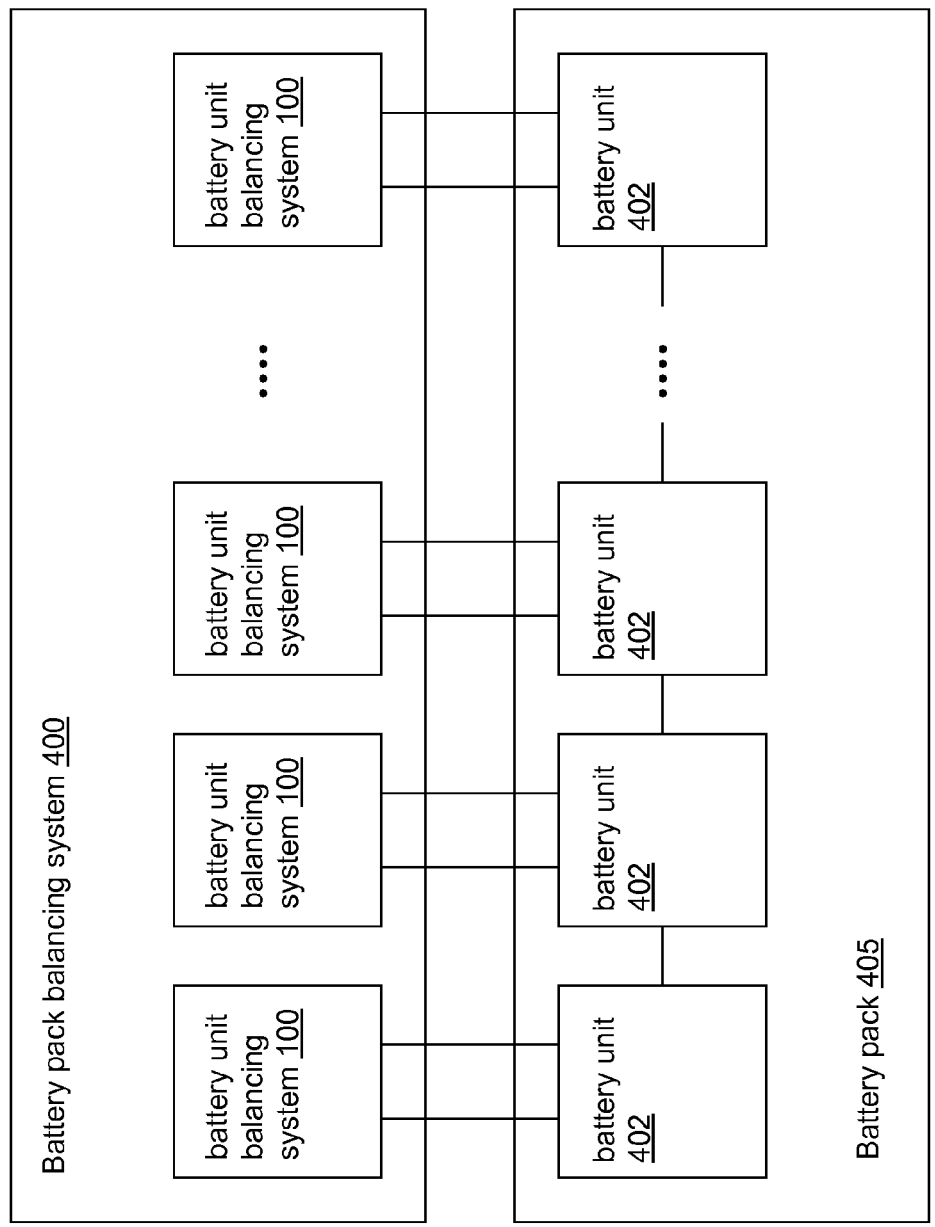
FIG. 4 is a block diagram of an embodiment of a plurality of battery unit balancing systems for balancing a battery pack.

Referring now to FIG. 4, a block diagram of an embodiment of a plurality of battery unit balancing systems for balancing a battery pack is shown and described. A battery pack balancing system 400 includes a plurality of battery unit balancing systems 100, each system being autonomous from one another. Each battery unit balancing system 100 can connect to a battery unit 402 in a battery pack 405. Each balancing system 100 can balance its corresponding battery unit 402 according to the steps described in reference to FIGS. 1-3. The balancing systems 100 can balance the battery units 402 to a substantially same level. Thus, the battery pack balancing system 400 can obtain a battery pack whose battery units 402 exhibit substantially the same state of charge levels.

In view of the structure and functions of the systems and methods described here, the present disclosure provides efficient systems and methods for balancing a battery unit. Having described certain embodiments of systems and methods for balancing the battery unit, it will now become apparent to one of skill in the art that other embodiments incorporating the concepts of the disclosure may be used. Therefore, the invention should not be limited to certain embodiments, but rather should be limited only by the spirit and scope of the following claims.

What is claimed:

1. A battery unit balancing system comprising:
   a. a discharging circuit configured for connection to a battery unit comprising:
      i. a voltage dividing circuit;
      ii. a comparator circuit comprising:
         1. a shunt regulator configured in parallel with said voltage divider;
      iii. one or more current source circuits comprising:
         1. current regulator; and
         2. an output device;
   wherein said output device, said shunt regulator and said one or more current source circuits are connected in parallel with the battery unit, wherein, while connected to the battery unit, the discharging circuit is configured for automatic activation such that, when a voltage of the battery unit exceeds a predetermined threshold, the discharging circuit draws a constant discharging current from the battery unit until the voltage of the battery unit falls below the predetermined threshold;
   wherein the voltage dividing circuit is connected to the comparator circuit via a node to the shunt regulator,
   said shunt regulator is connected to said current source circuit via a current limiting resistor of said output device,
   whereby the comparator circuit is activated to conduct when the voltage of the battery unit exceeds the predetermined threshold,
   the voltage dividing circuit is programmed to generate a predetermined voltage,
   wherein the predetermined voltage activates the one or more current source circuits via the comparator circuit, and
   whereby each current source circuit of the one or more current source circuits is configured such that a substantially stable current flows independent of the voltage of the battery unit.

2. The battery balancing system of claim 1, wherein the voltage dividing circuit comprises one or more resisters that are programmed to generate the predetermined voltage.

3. The battery balancing system of claim 1, wherein each current source circuit of the one or more current source circuits comprises:
   a. a first terminal connected between the battery unit and the balancing circuit, wherein said first terminal is connected to an emitter of a first transistor and a first terminal of a first resistor;
   b. a base of said first transistor connected to a second terminal of said first resistor and an emitter of a second transistor;
   c. a collector of said first transistor connected to a base of the second transistor; and
   d. a collector of said second transistor connected to said second terminal,
   wherein said second terminal is connected between said battery unit and said balancing circuit.

4. The battery unit balancing system of claim 1, wherein the comparator circuit does not conduct when the voltage of the battery unit is below the predetermined threshold.

5. The battery unit balancing system of claim 1, wherein each of the one or more current source circuits comprises one or more transistors and one or more resistors, wherein each current source circuit of the one or more current source circuits is configured such that the respective one or more transistors interact to form an equilibrium so that the stable current flows through the one or more resistors, thereby dissipating power.

6. The battery unit balancing system of claim 1, wherein the predetermined threshold is about 3.7V.

7. The battery unit balancing system of claim 1, further comprising a first output device for indicating the system is receiving power from the battery unit and a second output device for indicating the discharging circuit is activated.

8. The battery unit balancing system of claim 1, wherein the battery unit is a single battery cell.

9. The battery unit balancing system of claim 8, wherein the battery cell is lithium ion cell.

10. The battery unit balancing system of claim 1, wherein the voltage dividing circuit comprises:

a. a first resistor having a first resistor value;
  b. a second resistor having a second resistor value; and
  c. a node between said first and second resistors connected to a shunt regulator, whereby the voltage dividing circuit provides a node voltage to the shunt regulator of the comparator circuit having a value equal to the product of the voltage of the battery and the second resistor value divided by the sum of first and second resistor values.

11. The battery unit balancing system of claim 10, wherein at least one of the first and second resistors are variable resistors that can be adjusted to provide a node voltage to shunt regulator.

12. The battery unit balancing system of claim 1, whereby when said comparator circuit is activated to conduct, said voltage dividing circuit divides the battery voltage by approximately ⅓ to produce a voltage of 1.2V when said battery unit reaches said predetermined threshold at which time said current source is activated.

* * * * *